Aug. 29, 1961   A. O. RADKE ET AL   2,998,054
SEAT STRUCTURE FOR FARM TRACTORS AND THE LIKE
Filed Sept. 18, 1959   4 Sheets-Sheet 1

INVENTORS
Arthur O. Radke
Harvey N. Jengler
BY Popp and Sommer
ATTORNEYS

Aug. 29, 1961     A. O. RADKE ET AL     2,998,054
SEAT STRUCTURE FOR FARM TRACTORS AND THE LIKE
Filed Sept. 18, 1959     4 Sheets-Sheet 2

INVENTORS
Arthur O. Radke
Harvey N. Tengler
BY Popp and Sommer
ATTORNEYS

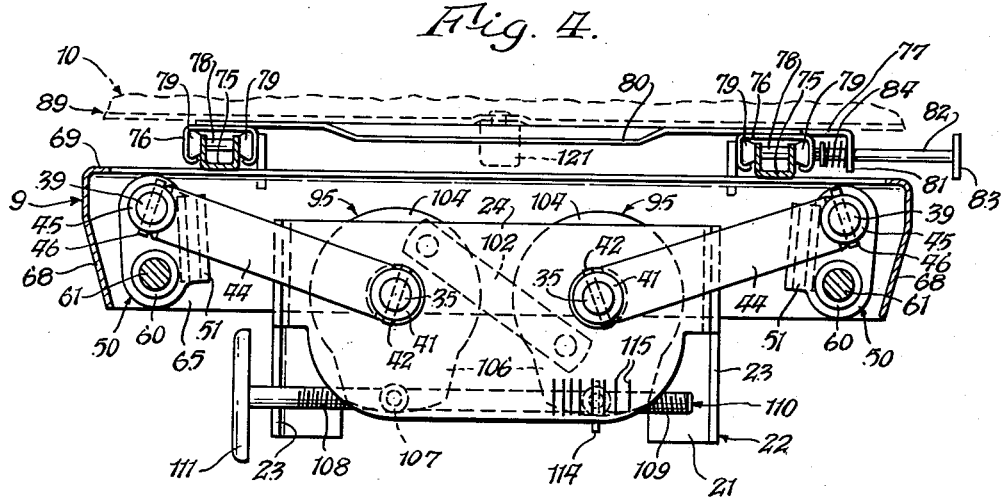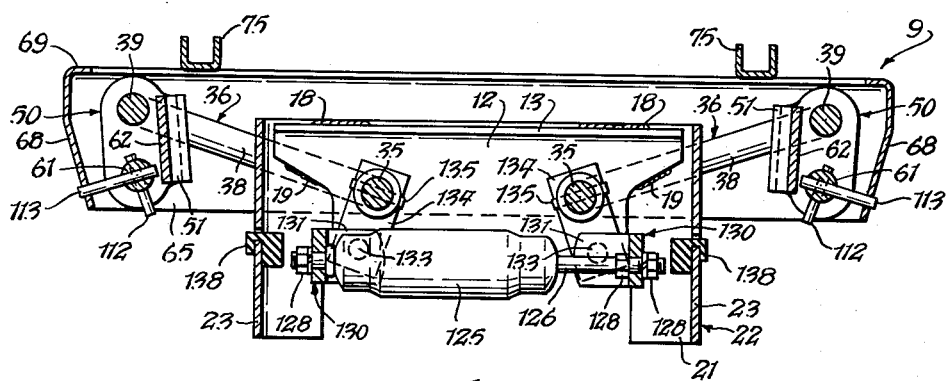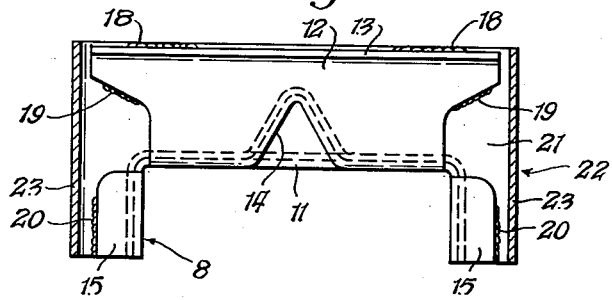

Aug. 29, 1961    A. O. RADKE ET AL    2,998,054
SEAT STRUCTURE FOR FARM TRACTORS AND THE LIKE
Filed Sept. 18, 1959    4 Sheets-Sheet 4

INVENTORS
Arthur O. Radke
Harvey N. Jengler
BY Popp and Sommer
ATTORNEYS

United States Patent Office 2,998,054
Patented Aug. 29, 1961

2,998,054
SEAT STRUCTURE FOR FARM TRACTORS
AND THE LIKE
Arthur O. Radke and Harvey N. Tengler, Milwaukee, Wis., assignors to Bostrom Corporation, Milwaukee, Wis., a corporation of Wisconsin
Filed Sept. 18, 1959, Ser. No. 833,243
8 Claims. (Cl. 248—374)

This invention relates to a resilient seat suspension and more particularly to such a seat suspension designed for use on extremely rough riding vehicles such as farm tractors and military vehicles, the seat suspension also being applicable for use in railroad locomotives.

This invention is an improvement on the seat suspensions disclosed in the Hickman Patent 2,704,568, dated March 22, 1955, and the Hickman, Simons and Marcinek Patent 2,783,822, dated March 5, 1957.

In common with said seat patents, important objects of the present invention are to provide a seat structure (1) in which the seat part is permitted to move against a geometric resilient resistance, both laterally and vertically, relative to the vehicle on which the seat is mounted; (2) which provides the maximum safety and comfort and leaves the occupant in full control of the vehicle; (3) in which the seat moves with the occupant and is not drawn or jerked away from the occupant whenever the pressure imposed by the occupant upon the seat becomes negative; (4) which will operate in a highly desirable frequency range regardless of the weight of the occupant; (5) which can be designed, within practical limits, to have any desired frequency and any desired resistance curve; (6) which reduces and cushions both the vertical and lateral impacts against the seated occupant without imposing undue thrust on the connections between the seat part and the vehicle; (7) in which torsion springs are employed to provide a longer and a variable spring resistance range; (8) in which the resilient support is provided by torsion springs which are simple, compact, low in cost and have long life and freedom from service difficulties; (9) in which geometric resilient resistance is obtained in a compact structure which requires little servicing and is free from noise; (10) in which the load from the seat part to the suspension means and from the suspension means to its base part is distributed at a plurality of spaced points; (11) in which both fore-and-aft and lateral tilting of the seat is prevented; (12) which is made of a plurality of low-cost and sturdy sub-assemblies which can be easily coupled together; (13) which includes a simple, strong and low cost shackle structure, and (14) which is extremely compact and sturdy and will stand up under conditions of severe and constant use with very little servicing.

A specific object of the present invention is to provide such a seat structure having a built-in hydraulic shock absorber so arranged and constructed as to permit a seat structure having all of the above features and which seat structure compresses to an extremely compact structure.

Another specific object is to provide such a seat structure in which the relatively large seat movement is translated into a relatively small shock absorber movement by a simple, inexpensive and compact mechanism comprising a pair of U-shaped yokes swingably mounted on fulcrum rods adjacent rubber torsion springs and pivotally supported in part by components of these rubber springs.

Another specific object is to provide a new and improved arrangement for slide rails and supporting tracks permitting fore-and-aft adjustment of the sitting position of the occupant, these rails and tracks being arranged at a higher elevation than heretofore so as to be more readily accessible and these supporting tracks also being a part of the moving part of the seat structure in contradistinction to being a part of the stationary or base part thereof.

Another specific object is to provide such tracks and slide rails of such form and to mount such tracks and slide rails in such manner that they form structural components of their respective supporting and supported sub-assemblies of the seat structure and eliminate the need for other structural components and contribute to light weight, compactness, and increased strength in the seat structure as a whole.

Another specific object is to provide improved means for resiliently limiting the lateral movement of the seat part of the seat structure, this being achieved by low-cost, resilient bumpers mounted to limit such lateral movements of the seat part with minimum strain and racking forces and without interfering with the normal functioning of any moving parts.

Another specific object is to provide such a seat structure including a seat pan tiltable to an inclined or inverted position and which includes a simple clip for releasably holding the seat pan in its operative position.

Another specific object is to provide such a seat structure which includes an intermediate frame structure on which the seat part is adjustably mounted, this intermediate frame having a surrounding apron concealing and isolating the larger part of the moving suspension members and completely telescoping around a base part frame and having a surrounding apron concealing and isolating substantially the balance of the moving suspension members, the moving suspension members being thereby isolated against possible injury to the fingers of an occupant and the seat as a whole being given a pleasing and sturdy appearance.

A further specific object is to provide an improved shackle construction, the pairs of shackles at opposite sides of the seat structure being joined together by a plate which strengthens the shackles, rigidifies the entire seat suspension against internal twisting or bending of parts under fore-and-aft and lateral forces; and form stops at each side limiting the upward movement of the seat pan.

Another specific object, in such a seat structure having a base part, an intermediate frame, and a seat part including a seat pan slidingly and pivotally mounted on said intermediate frame, is to provide a simple bottoming bumper means interposed directly between said base part and seat pan.

Other objects and advantages of the invention will be apparent from the following description and drawings in which:

FIGS. 4, 5 and 6 are vertical sectional views taken generally on the correspondingly numbered lines of FIG. 3.

The seat suspension embodying the present invention is designed primarily for use where rough riding or extreme vertical and lateral impact conditions are encountered, such as with farm tractors, railroad locomotives and military vehicles, where lateral as well as vertical stability is required. In general, the seat structure is shown as including a base part or supporting structure indicated generally at 8, and an intermediate structure or part indicated generally at 9 and a seat part or structure indicated generally at 10.

Figure 7:
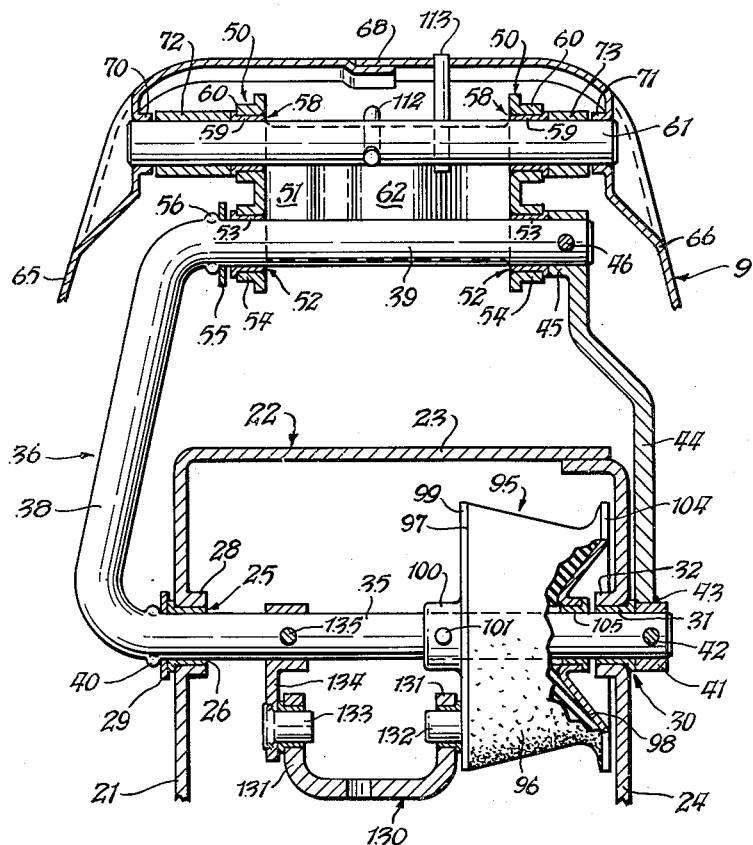
FIG. 7 is a stretched out view of the parts and taken generally on line 7—7, FIG. 5.

The base part or supporting structure 8 is shown as including a channel 11 extending fore-and-aft with reference to the seat with its side flanges extending downward. At one end the center part of the channel 11 is bent upwardly to provide an upstanding flange 12 the upper extremity of which is bent forwardly to provide a horizontal flange 13 and the flange 12 being reinforced by a V-shaped offset 14 provided jointly in this flange and in the cross part of the channel 11. The adjacent end of each of the side flanges of the channel 11 are bent to provide outwardly projecting side flanges 15. The flanges 12 and 15 are welded, as indicated at 18, 19 and 20 to the front wall 21 of a rectangular sheet metal frame 22 open at its top and bottom and additionally having side walls 23 and a rear wall 24, these walls forming an apron to conceal and isolate the moving parts housed in the frame. This frame 22 can be made of two U-shaped metal plates as shown in FIG. 7 welded together.

The front wall 21 carries a pair of bearings 25 arranged in a horizontal plane with their axes extending fore-and-aft and spaced equidistant from the fore-and-aft center line of the seat structure. These bearings can be of any form but as shown in FIG. 7 are preferably in the form of bearing bushings 26 arranged in tubular offsets 28 provided in the front wall 21. Preferably thrust washers 29 are arranged in front of the bearing bushings 26.

Axially in line with each of these bearings 25 the rear wall is provided with a companion bearing 30. These bearings 30 can also be in the form of a bearing bushing 31 contained within a tubular offset 32 in the rear wall 24.

Each companion pair of bearings 25, 30 journals the fulcrum rod 35 of a U-shaped crank arm structure indicated generally at 36, this crank arm structure having a crank arm portion 38 and a crank rod 39 projecting from the outer end of the crank arm portion 38 generally parallel and in the same direction as the fulcrum rod 35 thereof. The crank arm structure 36 is preferably in the form of a single rod bent to provide its component parts 35, 38 and 39 and the crank arm portions 38 of both of the crank arm structures 36 preferably diverge outwardly and rearwardly as best shown in FIGS. 3 and 7.

Each crank arm structure 36 is pinched to provide an offset or abutment 40 having thrust contact with the thrust washer 29 for the companion front bearing 25 and each of these crank arm structures is also provided with a collar 41 at the rear end of its fulcrum rod 35 in thrust relation to the companion rear bearing 30 and secured by means of a cross pin 42. To each collar 41 is welded, as indicated at 43, an auxiliary crank arm 44 the outer end of which is formed to provide a collar 45 fitting around and pinned to, as indicated at 46, the free or rear end of the companion crank rod 39.

Each crank rod 39 pivotally carries a pair of shackles 50, each companion pair of metal shackles being connected by a metal cross plate 51 welded thereto. To journal these shackles on the crank arms 39 each shackle is provided with a bearing 52 shown as comprising a bearing bushing 53 contained within a tubular offset 54 of the shackle 50. Each bearing 52 at the rear of the seat structure is shown as being in thrust relation to the collar 45 of the auxiliary crank arm 44 and each shackle bearing 52 at the front of the seat structure is shown as being in thrust relation to a washer 55 held against displacement by radial offsets 56 provided in each crank arm 39. The pair of shackles 50 at each side of the seat also carry a pair of coaxial bearings 58, each bearing 58 likewise preferably being in the form of a bearing bushing 59 contained in a tubular offset 60 in the shackle 50. The pair of these bearings 58 at each side of the seat structure jointly support and journal a rod 61 the opposite ends of which are fast to and support the intermediate frame 9. The cross plate 51 connecting each pair of shackles 50 can be of any suitable form but is preferably offset horizontally outwardly at its center, as indicated at 62, to provide clearance for moving parts. This cross plate contributes to the sturdiness of the entire suspension and also forms a stop for limiting upward movement of the seat part 10 as hereinafter described.

Figures 1, 2:
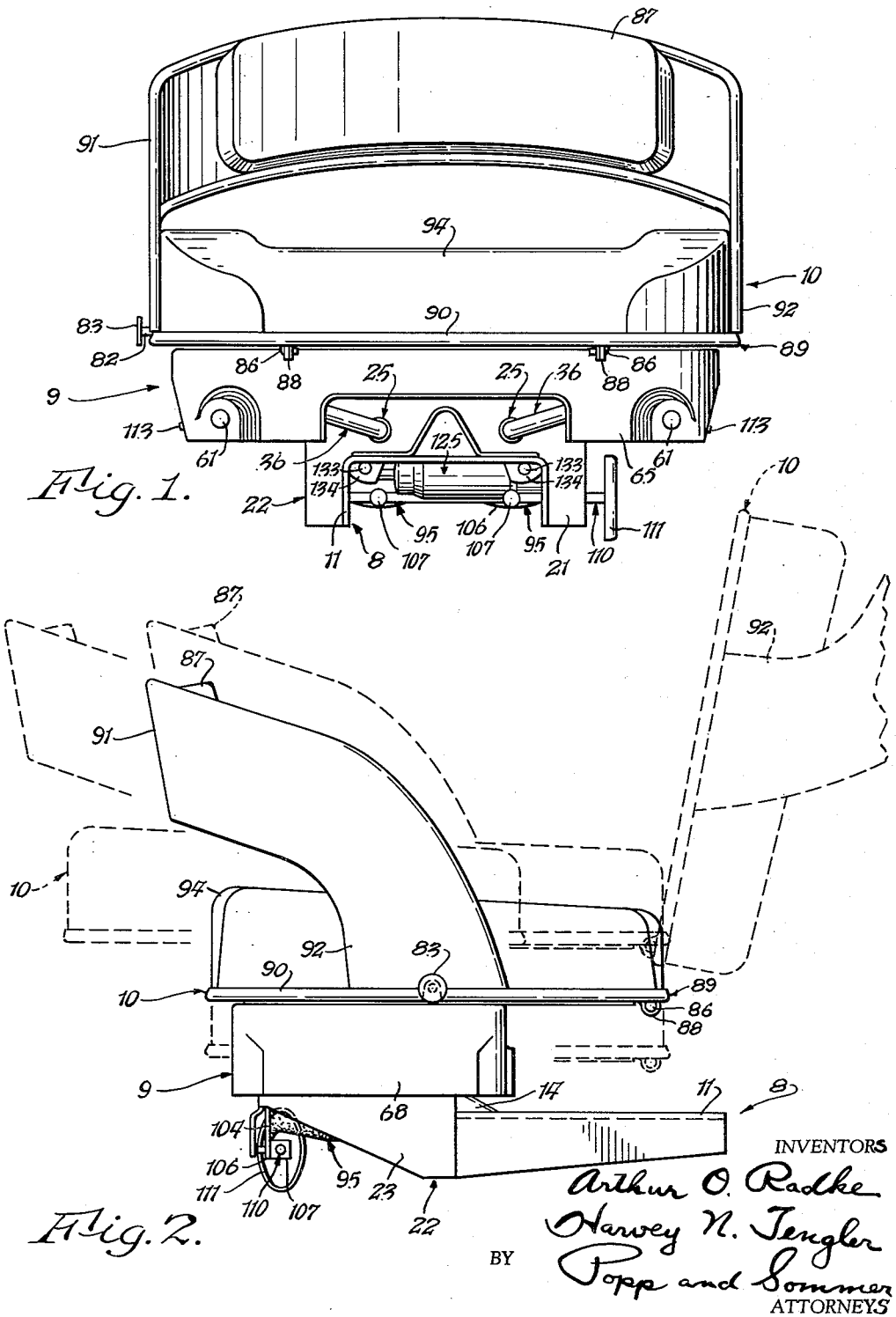
FIG. 1 is a front elevational view of a seat structure embodying the present invention and showing the same in its occupied position.
FIG. 2 is a side elevational view thereof and showing, in broken lines, different positions to which the seat portion of the seat structure can be moved.
Figure 3:
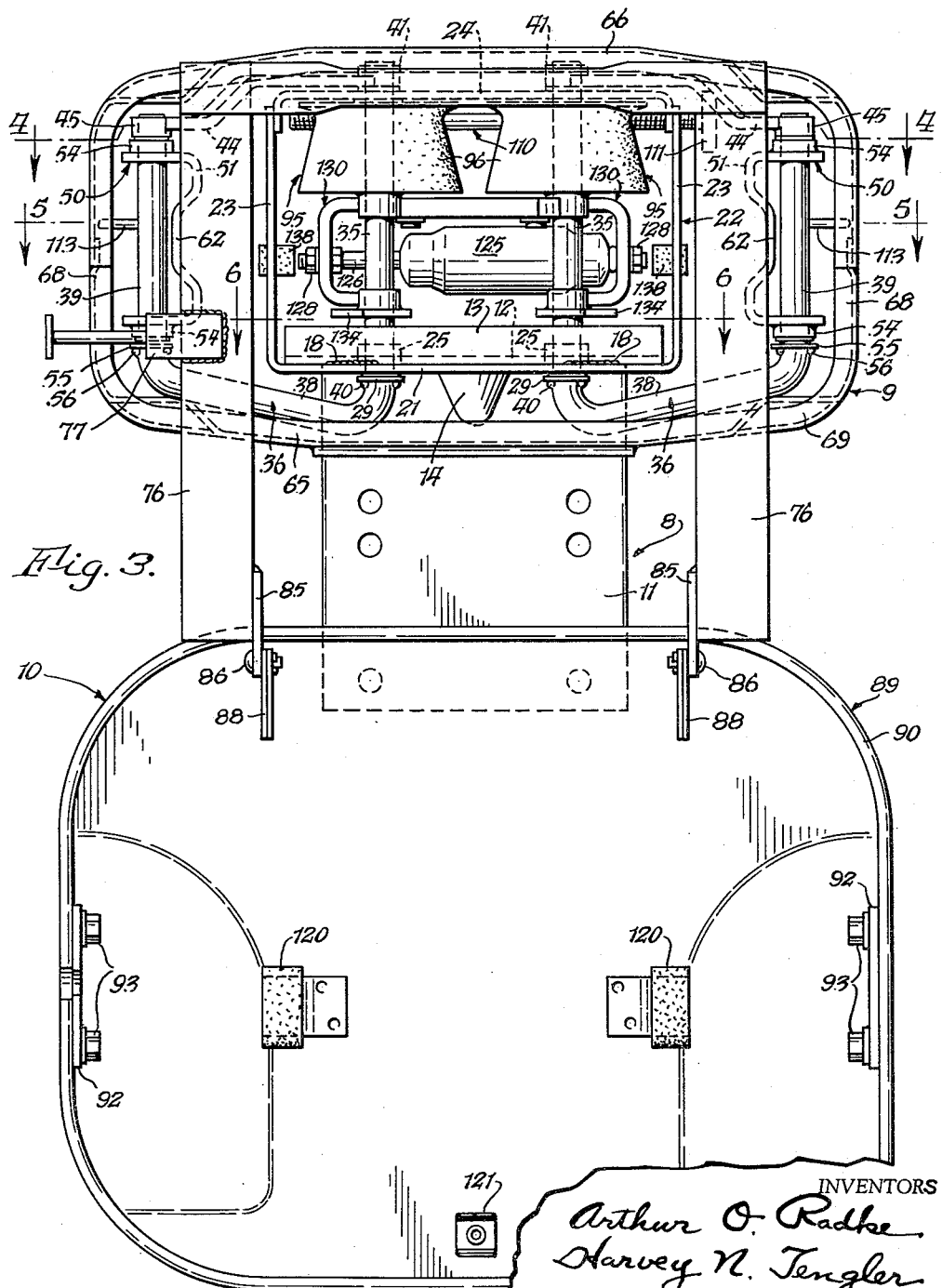
FIG. 3 is a fragmentary top plan view of the seat structure and showing its seat part in an inverted position.

The intermediate frame 9 is made of sheet metal and is shown as being of octagonal form in plan, elongated transversely of the seat as shown in FIG. 3 and open at its top and bottom so as to be, in effect, an endless rim, this frame being shown as made of two U-shaped sections as shown in FIG. 3, welded together. This intermediate frame 9 has a front wall 65, a rear wall 66 and side walls 68, these walls forming an apron concealing and isolating moving parts therein and having an upper inwardly extending top flange 69. The horizontal pins 61 can be connected to this intermediate frame 9 in any suitable manner, as by the provision of tubular bosses 70, 71 in the front and rear walls 65, 66 as best shown in FIG. 7. A tubular spacing sleeve 72 is shown as interposed between the boss 70 and adjacent bearing sleeve 59 and a tubular spacing sleeve 73 is shown as interposed between the boss 71 and adjacent bearing sleeve 59 as best shown in FIG. 7.

This intermediate frame 9 carries a pair of transversely spaced U-shaped tracks 75 welded to extend fore-and-aft with reference to the seat structure, these tracks being mounted on the top flange 69 with their flanges projecting upwardly. These racks contribute to the strength and rigidity of the frame 9 to which they are welded. Above each of these tracks is a slide rail 76 the flanges of which project downwardly and embrace the track 75. Each track 75 carries spaced horizontal supporting pins 78 on the ends of which rollers 79 are journalled, these rollers jointly supporting the corresponding slide rail 76. It will accordingly be seen that the fore-and-aft tracks, slide rails and rollers 75, 76 and 79 permit the intermediate frame 9 to be moved fore-and-aft, this being for the purpose of adjustment.

As best shown in FIGS. 3 and 4, the rear ends of the slide rails 76 are connected, as by welding, by a cross bar 80. Also welded to one of the slide rails 76 to project outwardly therefrom is a plate 77, one end of which is bent down to provide a flange 81 for supporting a horizontal latch pin 82 having an end head 83 adapted to be manually gripped. This latch pin 82 extends transversely of the seat structure and is slidingly mounted in the flange 81 and in the adjacent rail 76 with its inner end adapted to engage one of a series of holes (not shown) in the adjacent track 75 so as to hold the rails 76 at different positions of fore-and-aft adjustment. A helical compression spring 84 biases the pin 82 to its operative position.

A pair of upstanding ears 85 are welded to the forward ends of the tracks 76 and carry coaxial pivot pins 86 which are arranged on a horizontal transverse axis. These pivot pins 86 support ears 88 fast to and projecting downwardly from a seat pan 89 forming part of the seat part 10. This pan is shown as being made of sheet metal with a beaded rim 90 and generally of rectangular form with rounding corners. A sheet metal backrest 91 is shown as having downwardly projecting end portions or legs 92 removably secured to the sides of the seat pan 89 by stud bolts having nuts 93. The seat pan 89 can be provided with a seat cushion 94 of any suitable form and the backrest 91 can be provided with a back cushion 87 of any suitable form.

The springs for yieldingly supporting the intermediate frame 9, rails 75 and tracks 76 and seat part 10 in an elevated position comprise a pair of rubber torsion springs indicated generally at 95. Each of these rubber torsion springs 95 can be of any suitable construction and is shown as comprising a frusto-conical body 96 of rubber having a flat forward face 97 and having a concave rear face 98. To the outer flat face 97 of each rubber body 96 is vulcanized a metal plate or disk 99. Each plate 99 rotates with the corresponding fulcrum rod 35 and crank arm structure 36 and for this purpose is provided with a hub 100 connected to the corresponding fulcrum rod 35 by a cross pin 101. In order to compel the two plates or disks 99 to rotate in unison so that both sides of the seat part 10 must rise and fall together without tipping, these plates are interconnected by a link 102 which is pivotally connected at its opposite ends to each of these plates in the manner shown in greater detail in the said Hickman, Simons and Marcinek patent.

To the opposite concave face 98 of each rubber body 96 is vulcanized a convex metal anchoring plate 104 journalled on the corresponding fulcrum rod 35 as by a bearing bushing 105. This anchoring plate is shown as having an outwardly projecting marginal flange 106 that is shown in FIG. 4 and illustrated in greater detail in said Hickman, Simons and Marcinek patent.

Means are provided whereby the seat can be readily adjusted to have any degree of pretension or windup provided corresponding to the weight of the driver. For this purpose a swivel pin 107 is rotatably secured to each of the ears or flanges 106 of the anchoring plates 104 to swivel about a fore-and-aft axis, these swivel pins also being in the form of nuts for the threads 108, 109 at opposite ends of a horizontal transverse adjusting screw 110. This adjusting screw has a handle 111 for conveniently turning the same and the threads 108, 109 are in reverse relation to each other so that turning the adjusting screw 111 moves rotatably the anchoring plates 104 in reverse relation to each other so as to adjust the degree of pretension or windup thereof.

For this purpose the upward movement of the seat part 10 is limited by a pair of stop pins 112 projecting from the rods 61 in the path of the cross plate 62 as best shown in FIG. 5. Each of these rods 61 is also preferably positively held against turning with reference to the intermediate seat frame 9 by means of a pin 113 extending through each of these rods and into a hole provided in the rim or apron wall 68 of the intermediate frame 9. One of the swivel pins 106 is also preferably provided with a downwardly directed pointer 114 traversing a graduated scale 115 on the rear wall 24 of the base frame 22.

In addition to the stop pins 112, which limit the upward movement of the seat part by engaging the cross plate 51 of the shackles 50 as above described, a pair of bottoming bumpers 120 are suitably secured to the underside of the seat pan 89 in a position to engage the top flange 13 of the channel 11 of the base part 10. Also, to hold this seat pan 89 against bobbing up and down on its pivot pins 86 a two-legged clip 121 is mounted on underside of the seat pan near free end thereof and in a position to have its legs pass around and engage and releasably grip the center part of the crossbar 80 connecting the rear ends of the slide rails 76.

An important feature of the invention resides in the provision of a hydraulic shock absorber for controllng the action of the seat. This hydraulic shock absorber is shown as having two telescoping members movable along a straight line in the form of a hydraulic cylinder 125 and a piston provided with a piston rod 126 projecting from one end of the cylinder 125, the movement of the piston rod with reference to the cylinder being hydraulically restrained. The free end of the piston rod 126 and the opposite end of the cylinder 125 are each secured, as by nuts 128, to the center part of a U-shaped yoke 130 having end legs 131. The shock absorber is thereby operatively interposed and cradled between these U-shaped yokes. One end leg 131 of each yoke is pivotally mounted on a pivot pin 132 projecting from the plate 99 of the adjacent rubber spring 95 as best shown in FIG. 7. The other leg 131 of each yoke is journalled on a pivot pin 133 projecting from a crank arm 134 fixed to the corresponding fulcrum rod 35 by means of a cross pin 135 as best shown in FIG. 7. These crank arms normally project in a generally vertical direction, as shown, and each pivot pin 133 is coaxial in relation to its companion pivot pin 132.

The end extremities of the shock absorber assembly are adapted to meet rubber bumpers 138 in the expanding extremity of movement of the shock absorber assembly transversely of the seat frame. These bumpers 135 are mounted on the side walls 23 of the base frame 22 and cushion upward movement of the seat part 10 with reference to the base part 8 and serve to assist the stop pins 112 in holding the seat part under adjusted preload.

In the operation of the seat structure, which is shown in its normally loaded or intermediate position, the downward movement of the seat part 10, through the slide rails 76, tracks 75, intermediate structure or frame 9, rods 61 and shackles 50, swings the free ends or crank pins 39 of the crank arm structures 36 downwardly, the fulcrum rods 35 of these crank arm structures oscillating in their bearings 25 and 30 provided in the front and rear walls 21, 24 of the base frame 22 comprising part of the base part or supporting structure 8.

The rotation of each fulcrum rod 35 is yieldingly resisted by the pair of rubber torsion springs 95, this movement of each fulcrum rod 35 being transmitted through the pins 101 and hubs 100 to the disk 99 vulcanized on the rubber body 96, and the rotative force of each rubber body 96 is transmitted through the anchoring plates 104 and their swivel pins 107 to the adjusting screw 110. Since the fulcrum rods 35 and rubber bodies 96 are oscillated in reverse direction to each other, these rubber bodies act in reverse direction against the adjusting screw 110 and hence cancel out. Turning the adjusting screw 110 moves the pointer 114 of one of these swivel pins 107 along the scale 115 on the rear wall 24 of the frame 22 of the base structure 8 and serves to adjust the degree of pretension or windup of the rubber springs 95. Thus, the upward movement of the seat part 10 of the seat structure is limited by the stop pins 112 engaging the cross plates 51 of the shackles 50 and hence turning the screw 110 can pretension the rubber springs 95 to accommodate drivers of different weight.

Lateral tipping of the seat part 10 is minimized by the link 102 interconnecting the end plates or disks 99 of the two rubber springs 95. This link pivotally connects these end plates 99 to rotate in unison and since these end plates are fixed to the two fulcrum rods 35 the pins 101, this link compels the two fulcrum rods 35 to rotate in unison. It will be noted by the positioning of the link 102 as shown, the swinging movement of one crank arm structure 36 can occur only when there is a corresponding movement of the other crank arm structure 36. At the same time, the seat part 10 is capable of lateral movement which is permitted by the shackles 50. These shackles yieldingly hold the seat part 10 in a centered relation to the base part 8.

When the seat part 10 moves downwardly relative to the base part 8 from the normal loaded position shown in the drawings, or, when the base part 8 is forced upwardly relative to the seat part 10, the effective opposing force of the rubber springs 95 increases at a geometric and not an arithmetic rate. In this particular case, the geometric rate of change of resistance is of accelerated increase type in which increments of vertical movement of the base part 8 are opposed by an accelerated rate of increase of resilient resistance. This is due to the progressive decrease in the effective leverage of the crank arm structures 36 as they swing downwardly from the position shown in FIGS. 4 and 5. This action is also influenced by the fact that increments of vertical displacement of the outer ends or crank pins 39 of the crank arm structures 36 have accelerated rates of increase in the angular displacement of the rubber torsion springs 95. This latter is due to the fact that increments of vertical movement of the outer ends of the crank arm structures 36 are not proportional to the accompanying increments of angular twist to which the rubber springs are subjected.

This geometric action also occurs when the base part 8 moves downwardly relative to the seat part 10 from the normal loaded position shown in the drawings. Throughout this particular movement, the geometric action is of the accelerated decrease type, that is, as the base part 8 moves through increments of downward movement, the rate of decrease of the resilient forces tending to push the seat part 10 downwardly increases.

By this means, so far as vertical forces are concerned, the seat part 10 is free to "float" along solely under the influence of gravity (plus whatever vertical momentum forces are present) this feature being of particular significance when it is realized that the occupant is also, at this time, solely under the influence of gravity (plus whatever vertical momentum forces are present). The consequence is that within this particular range of movement, the occupant of the seat moves vertically up and down with the same acceleration and deceleration as the seat part 10 and hence without changing the pressure between the occupant and the seat. Such a desirable result is quite different from that obtained from conventional seat suspension in which the vertical force jerks the seat down whenever the strain imposed on the seat part is negative. With the present seat suspension means, no such forces tending to pull the seat part down are possible.

Rotation of the fulcrum rods 35 and the disks or plates 99 also rotates the pivot pins 132 on these plates together with the coaxial pivot pins 133 on the arms 134 fast to these fulcrum rods 35, as best shown in FIG. 7. Since the rotation of the fulcrum rods 35 is in opposite directions this rotates the pair of coaxial pins 132, 133 at one side of the seat structure toward and from the pair of coaxial pivot pins 132, 133 at the other side of the seat structure. Since these pair of pivot pins carry the U-shaped yokes 130 and since the cross parts of these yokes are connected to the opposite ends of the telescopic hydraulic shock absorber 125, the movement of the fulcrum rods 35, and hence the entire action of the spring suspension, is under control of this hydraulic shock absorber which can be constructed to achieve any desired restraint upon the action of the seat structure. It will particularly be noted that this shock absorber, while fully effective does not increase the bulk of the seat structure as a whole, the shock absorber being horizontal and rising when the seat part 10 descends relative to the base part 8. Further, it will be seen that the yokes 130 and their mounting translate, with a very simple structure, the relatively large vertical movement of the seat part 10 into the required very small movement of the shock absorber 125.

In addition to the stop pins 112, upward movement of the seat part 10 is yieldingly stopped, by the pair of rubber bumpers 138 (FIG. 5) on the base frame 22 in line with the ends of the shock absorber 125. These stops permit the adjustment of the rubber spring to any desired preload. Bottoming is yieldingly stopped by the pair of bumpers 120 provided on the underside of the seat pan 89 and which bottom against the top horizontal flange 13 of the channel iron 11 forming a component of the base part 8. The bottoming bumpers 120 while fully effective do not interfere with the swinging of the seat pan 89 about its pivot pin 86 to invert the seat pan. At the same time, the spring clip 121 provides a simple and effective clip to hold the seat part 10 in its operative position by gripping the cross bar 80 of the two slide rails 76 on which the seat pan 89 is pivoted.

It will be noted that by the provision of the intermediate structure 9, the moving parts of the suspension, so far as resisting vertical and lateral forces are concerned, are interposed between this intermediate structure 9 and the base structure 8 leaving the seat part 10 free for adjustment horizontally relative to the intermediate structure by means of the simple slide tracks 75 and invertible by means of the pivot pins 86 as shown. Thus, to adjust the seat fore-and-aft, the driver merely reaches directly below the seat pan 89 and pulls the pin 82 so as to release its operative end from one of the holes (not shown) in the rail 76 following which the rollers 79 permit free adjustment of the seat part 10 fore-and-aft until a position is reached that suits the particular driver. It will also be noted that the tracks 75 materially strengthen the intermediate structure 9 all at the same time serving essentially to permit fore-and-aft adjustment of the seat part 10. Also to invert the seat, all that is required is for him to pull up on the back 91 to release the clip 121 on the seat part from the cross bar 80 connecting the two side slide rails 76.

While the part 9 has been described as an intermediate part or frame with reference to the base part 8 and seat part 10, it will be seen that in its broader aspect this intermediate frame 9 and the seat part 10 jointly constitute a seat part. The claims are therefore to be interpreted as including this broader definition of seat part except where specifically limited to exclude such interpretation.

From the foregoing, it will be seen that the present invention provides a seat having a hydraulic shock absorber and which is fully adjustable throughout, and which is at the same time extremely compact with parts nesting and telescoping into one another and is rugged in construction and low in cost.

We claim:

1. In a seat structure having a seat part, a base part, a pair of generally horizontal, generally parallel spaced fulcrum rods journalled in one of said parts and each having at least one normally generally horizontal crank arm projecting in a direction opposite to the crank arm of the other fulcrum rod, and moveable means connecting the outer ends of said crank arms with the other of said parts; the combination therewith of means restraining movement of said crank arm comprising a shock absorber having two relatively axially moveable members each arranged adjacent a corresponding fulcrum rod, a crank arm means fast to each fulcrum rod and substantially normal thereto and extending generally in a vertical direction therefrom, a pivot pin connected to each of said crank arm means on a pivot line coaxially spaced from the associated rod of said fulcrum rods, one member of said shock absorber pivotally attached to one of said pivot pins, the other member of said shock absorber pivotally attached to the other of said pivot pins.

2. In a seat structure having a seat part, a base part, a pair of generally horizontally, generally parallel spaced fulcrum rods journalled in one of said parts and each having at least one normally generally horizontal crank arm projecting in a direction opposite to the crank arm of the other fulcrum rod, and moveable means connecting the outer ends of said crank arms with the other of said parts; the combination therewith of means restraining movement of said crank arm, comprising a crank arm means fast to each fulcrum rod and normally projecting in a generally vertical direction therefrom, a shock absorber having two telescoping members moveable along a straight line, two sets of pivot pin pairs, each pair connected to one of said crank arm means on pivot lines coaxially spaced from the respective of each of said fulcrum rods, one of said shock absorber members pivotally connected to one pair of said set of pivot pins, the other of said shock absorber members pivotally connected to the other pair of said set of pivot pins.

3. In a seat structure having a seat part, a base part, a pair of generally horizontal, generally parallel spaced fulcrum rods journalled in one of said parts and each having at least one normally generally horizontal crank arm projecting in a direction opposite to the crank arm of the other fulcrum rod, and movable means connecting the outer ends of said crank arms with the other of said parts; the combination therewith of means restraining movement of said crank arm, comprising crank arm means fast to each fulcrum rod and carrying a pair of coaxially spaced pivot pins spaced vertically from the fulcrum rod, a U-shaped yoke having its arms swingably supported by the pivot pins of each pair, a shock absorber having two telescoping members movable along a straight line, means operatively connecting one of said shock absorber members with one of said yokes, and means operatively connecting the other shock absorber member with the other of said yokes.

4. In a seat structure having a seat part, a base part, a pair of generally horizontal, generally parallel spaced fulcrum rods journalled in one of said parts and each having at least one normally generally horizontal crank arm projecting in a direction opposite to the crank arm of the other fulcrum rod, and movable means connecting the outer ends of said crank arms with the other of said parts; the combination therewith of means restraining movement of said crank arm, comprising a coaxial disk fast to each of said fulcrum rods, an additional crank arm fast to each fulcrum rod and normally projecting in a generally vertical direction therefrom, coaxial pivotal pins on said disk and additional crank arm of each fulcrum rod and spaced vertically therefrom, a U-shaped yoke having its arms swingably supported by the pivot pins of each fulcrum rod, a shock absorber having two telescoping members movable along a straight line, means operatively connecting one of said shock absorber members with one of said yokes, means operatively connecting the other of said shock absorber members with the other of said yokes, a rubber body fast at one end to each disk and means anchoring the other ends of said rubber bodies.

5. A seat structure, comprising a base part including a horizontal frame having connected front, rear and side sheet metal walls, a seat arranged above said base part, an intermediate horizontal frame part having connected front, rear and side sheet metal walls, said intermediate frame part being of larger size than the frame of said base part and telescoping downwardly around the same, a pair of generally horizontal, generally parallel spaced fulcrum rods journalled in one of said parts, at least one normally generally horizontal crank arm fixed to each fulcrum rod and projecting in a direction opposite to the crank arm of the other fulcrum rod, movable means connecting the outer end of said crank arms with the other of said parts, means resiliently restraining movement of said parts toward and from each other, and means adjustably mounting said seat upon said intermediate horizontal frame part for adjustment in a plane parallel to the plane of said intermediate frame part and having a latch means for holding said mounting means from movement, an adjusting means connecting said fulcrum rods for adjusting said resilient restraining means, said frame parts covering all parts of said fulcrum rod, said crank arms, said movable means and said restraining means, said adjusting means extending through one of said frame parts to provide ease of adjustability of said seat structure components.

6. A seat structure, comprising a base frame having connected front, rear and side sheet metal walls, a seat arranged above said base frame, an intermediate frame having connected front, rear and side sheet metal walls, said intermediate frame being of larger size than said base frame and telescoping downwardly around the same, a pair of generally horizontal generally parallel fore-and-aft fulcrum rods journalled in the front and rear walls of said base frame to project outwardly therefrom, a crank arm fast to each projecting end of each fulcrum rod and normally projecting in a generally horizontal direction toward the adjacent side wall of said intermediate frame, movable means connecting the outer ends of said crank arms with said intermediate frame, shock absorbing means operatively interposed between each fulcrum rod and said base frame and resiliently restraining movement of said intermediate frame toward and from said base frame, and means adjustably mounting said seat upon said intermediate frame for adjustment in a plane parallel to the plane of said intermediate frame part and having a latch means for holding said mounting means from movement, an adjusting means connecting said fulcrum rods for adjusting said shock absorbing means, said frame parts covering all parts of said fulcrum rods, said crank arms, said movable means, and said shock absorbing means, said adjusting means extending through one of said frame parts to provide ease of adjustability of said seat structure components.

7. In a seat structure having a seat part, a base part, a pair of horizontal, generally parallel spaced fulcrum rods journalled in one of said parts and each having a pair of normally horizontal, parallel crank arms projecting in a direction opposite to the pair of crank arms of the other fulcrum rod, and means resiliently resisting movement of said fulcrum rods; the combination therewith of shackle means connecting the free ends of each said pair of crank arms to the other of said parts, comprising a crank rod connecting the free ends of each said pair of crank arms, a rod arranged generally parallel with each crank rods and mounted at its opposite ends in said other of said parts, a shackle journalled on and pivotally connecting each end of each crank rod with the adjacent end of the corresponding rod connected to said other of said parts, a plate extending lengthwise of each of said crank rods and rigidly connecting together the corresponding shackles at opposite ends thereof, and a stop pin projecting laterally from each of said rods connected to said other of said parts and arranged in the path of the corresponding plate to limit the upward movement of said seat part.

8. The combination set forth in claim 7 wherein a second cross pin projects laterally from each of said rods connected to said other of said parts and has its outer end anchored in said other of said parts.

References Cited in the file of this patent
UNITED STATES PATENTS

| | | |
|---|---|---|
| 2,606,592 | McIntyre | Aug. 12, 1952 |
| 2,614,608 | Ardussi | Oct. 21, 1952 |
| 2,667,209 | Gundersen | Jan. 26, 1954 |
| 2,704,568 | Hickman | Mar. 22, 1955 |
| 2,856,984 | Simons | Oct. 21, 1958 |
| 2,868,273 | Barrett | Jan. 13, 1959 |
| 2,894,562 | Peller | July 14, 1959 |